Nov. 20, 1928.
R. ROESSLER
MEAT CHOPPER
Filed Sept. 22, 1927      2 Sheets-Sheet 1
1,692,574
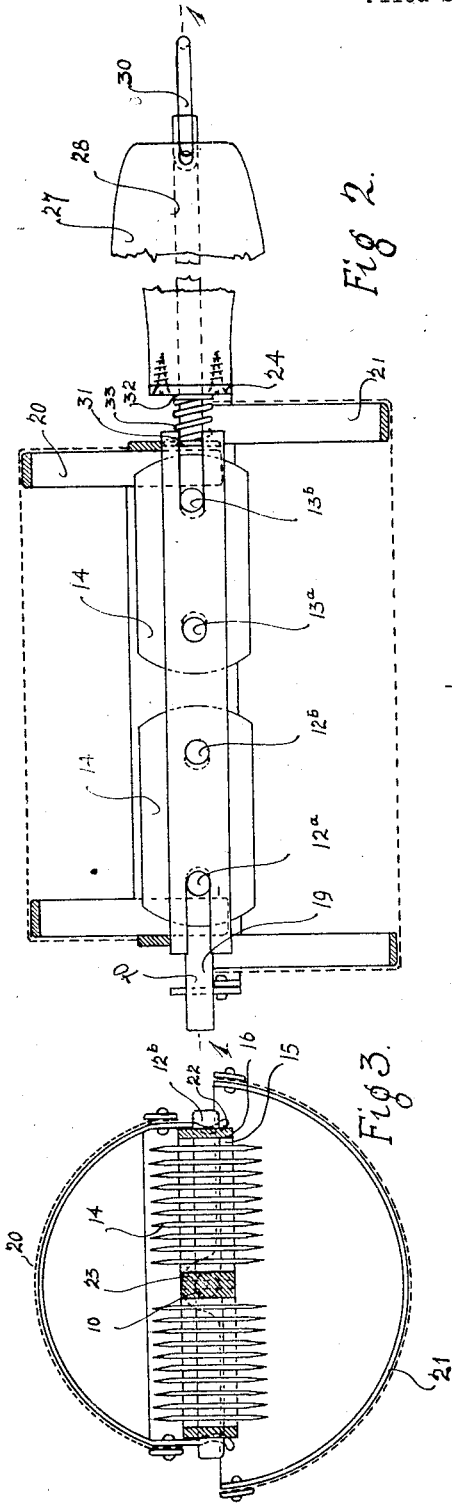
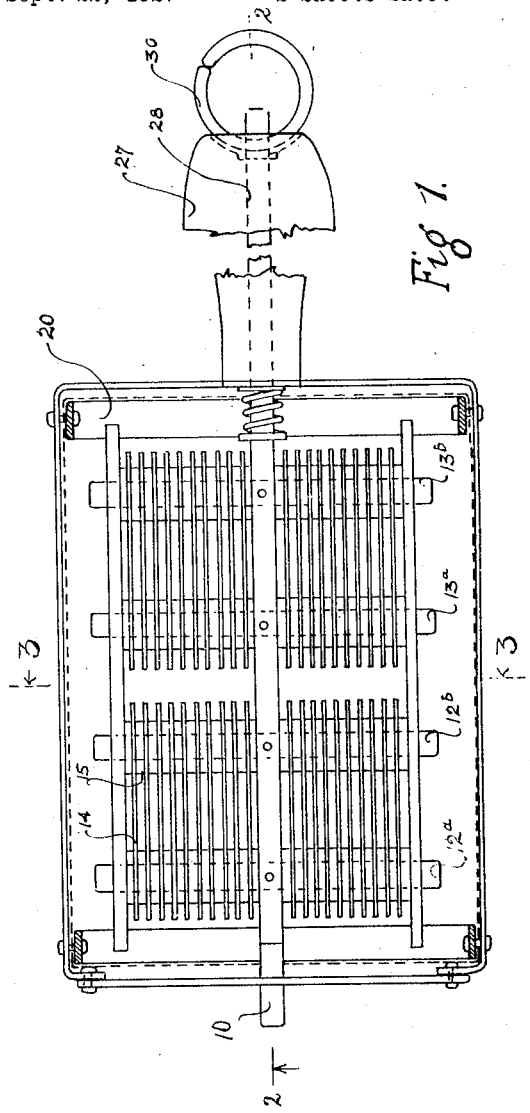
Robert Roessler
Inventor
By his Attorney

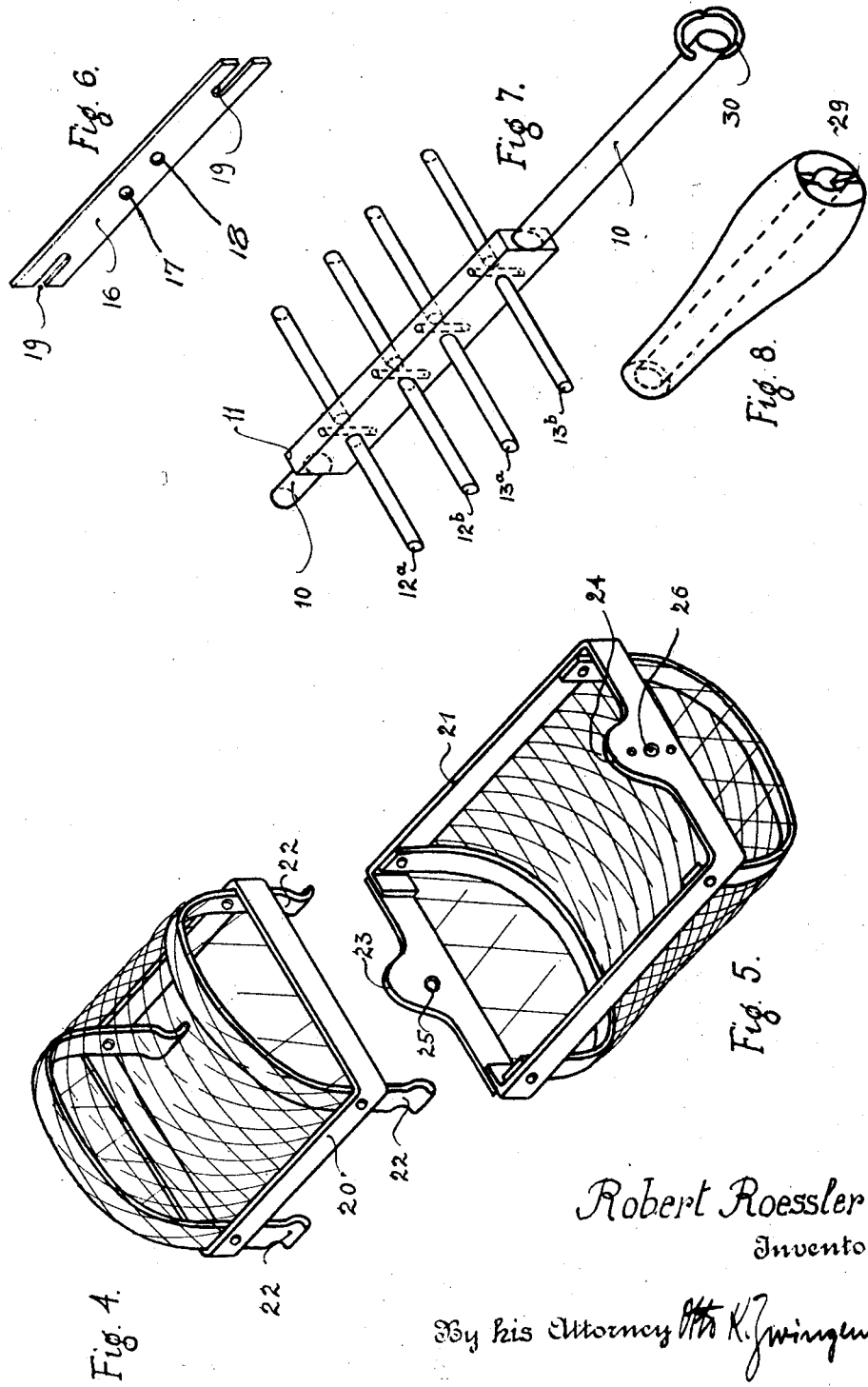

Patented Nov. 20, 1928.

1,692,574

UNITED STATES PATENT OFFICE.

ROBERT ROESSLER, OF HOBOKEN, NEW JERSEY.

MEAT CHOPPER.

Application filed September 22, 1927. Serial No. 221,274.

This invention relates to meat choppers and has for its object to provide means for reducing meat and similar food to a fine pulp without squeezing out the juice of the same.

In the meat chopping machines now universally in use the meat is pressed by means of a screw conveyor through a plate provided with a great number of narrow apertures whereby a great part of its nutritious value is lost because the juice is squeezed out of the meat. The means provided for this purpose by my new invention avoids this loss and furthermore allows the housewife to chop a piece of meat or other food without any bodily effort in as short a time as could be done with a meat chopper of the prior art and she can thus assure herself that for instance a desirable piece of meat, selected by her, retains its full food value by chopping it with my new device.

These and other ends in view will be more apparent from the following specification and the illustrations of the accompanying drawings, in which—

Figure 1 is a sectional top view of my new meat chopper on the line 1—1 of Figure 2, with the top screen, forming part of the device, having been removed therefrom;

Figure 2 is a sectional side view on the line 2—2 of Figure 1, the top screen being shown in position;

Figure 3 is a sectional front view on the line 3—3 of Fig. 1, the top screen being also here shown in position;

Figure 4 is a perspective view of the top screen;

Figure 5 is a perspective view of the lower screen, the same being adapted to revolve;

Figure 6 is a detail view of a means preventing the cutting members from sliding off the holding means;

Figure 7 is a detail view of the means holding the cutting means in position;

Figure 8 is a detail view of the handle with which the meat chopper is provided.

Referring now to the drawings, the numeral 10 denotes an annular central rod which in a short distance from its front end extends into a flat body or bar 11 of slightly greater length than one or more safety blades when longitudinally aligned; in the device illustrated by way of example a slightly greater length than that of two safety razor blades has been adopted for this bar 11. Pins $12^a$ and $12^b$ and $13^a$ and $13^b$ are rigidly arranged by any suitable means in said bar 11 perpendicularly to its vertical central axis and extend equidistantly on both sides of the same; the pins $12^a$ and $12^b$ as well as $13^a$ and $13^b$ being spacedly related to each other and distantly apart for the same distance as the two outer holes in the safety razor blades so that one such Gillette safety razor blade 14 after the other can be filed on each pair of pins with a washer 15 between each two adjoining razor blades. These washers 15 can be of any suitable material, such as a metal, vulcan fiber, cork, hard or soft rubber; at the present state of development of my invention I prefer to make them of soft rubber as explained below. If enough blades, for instance ten (10) are arranged on each pair of pins on either side of bar 11, I arrange strips 16, provided with apertures 17 and 18 to fit the pins $12^b$ and $13^a$, respectively, and slots 19 at both ends to fit the pins $12^a$ and $13^b$, over the said pins on both sides of the bar 11. The blades 14 are protected by two semi-cylindrical baskets 20 and 21 arranged, respectively, on top and below the said blades. Both baskets are formed by frames of flat metal strips over which screens of fine metal are arranged. The rounded parts of the metal frame of basket 20 extend into concavely shaped feet 22 which with their curvature snap into the slots 19 of the strips 16 when the basket 20 is pressed down over the blades 14 (Figure 3).

The lower basket is similarly arranged as basket 20, but of wider dimensions; it is provided in substantially the middle of the narrow sides of the flat frame with lugs 23 and 24, provided with annularly shaped holes 25 and 26, respectively, disposed centrally in aforesaid lugs; by the same the basket 21 is brought into operative engagement with the central rod 10 which serves as a pivot for the basket to swing around.

The rear part of the central rod 10 is surrounded by a handle 27 having a bore 28 extending co-axially with the central axis of said rod 10. This handle is rigidly secured to lug 24 by any suitable means, for instance by two screws projecting through said lug 24 and being fastened in said handle 27. This handle is furthermore provided at its rear end with a normally horizontally extending, concavely shaped groove 29 so as to receive the ring 30 passing through a hole in the rear end of the rod 10.

A washer 31 is secured to the rod 10 close to the rear end of the bar 11; another washer 32 is secured to the lug 24 and an expansion spring 33 is interposed between these washers and presses the handle 27 tightly upon the ring 30.

The use of the device is obvious from the above description. In using it one turns first the lower basket 21 upwardly above the basket 20 and draws it over the meat at the same time gently pressing the lower edges of the blades 14 downwardly. Besides meat the device cuts any other food, such as potatoes, cabbage, carrots, and the like in a most desirable way. If the operation of the device must be interrupted, one turns the device and rests it simply on the back of basket 20. If food should accumulate in the space between the blades 14 and the upper basket 20, the latter is taken off the strips 16 and the food is removed. Moreover, a blade usually breaks by splitting along the middle in the line of the apertures provided in the same; such a broken blade can be easily pushed out with a pair of scissors or the like means; after the removal of the broken blade the washers 15 on the pins, for instance $12^a$ and $12^b$, having held the broken blade in place, are cut, whereupon the whole set of blades 14 is pushed towards the bar 11, adds a new blade on the rods $12^a$ and $12^b$ and holds the replenished set together by the strip 16. The repair of the chopper is made within a few minutes time.

If the lower edge of the blades 14 has become dull, one turns the frame, holding the blades 14, around by compressing the spring 33 thus releasing the handle 27 from the spring 30, which acts as a locking device, whereupon one can turn the frame 180 degrees around its axis so as to bring the upper edges down for service.

In the examples by which my invention is illustrated above, the pins $12^a$, $12^b$ and $13^a$, $13^b$ are arranged in one plane; but this is not necessary by all means, as the pairs of pins could eventually be set back against each other so as to have the edges of the blades carried by the pins step down or upwardly thereby bringing out a cutting edge similar to that of a knife tapering to either of its ends.

The locking means, described above, consist of the ring 30, engaging the groove 29 and being operated by the spring 33 arranged around the rod 10 between the washers 31 and 32 secured on said rod 10, and can be substituted by many other devices which will act likewise to prevent the set of blades 14 from turning during the use of the device.

Many other changes could be made without deviating from the constructive principle of my invention; for instance the front and rear walls of the semi-circular basket 20 and 21 could be omitted, or the basket 21 could also be made detachable like basket 20; furthermore the pins $12^a$, $12^b$ and $13^a$, $13^b$ and plates 16 with the apertures and slots therein must of course be formed in accordance with the central apertures by which other safety blades vary from the Gillette safety blades shown in the illustrations of the accompanying drawings.

What I claim is:

1. In a meat chopper the combination comprising a central rod, pins arranged in the same plane perpendicularly to and equidistantly on both sides of aforesaid rod, a plurality of safety razor blades arranged on said frame parallel to and in a short distance from each other, means holding said blades on aforesaid pins, an upper basket detachably arranged on aforesaid holding means, a lower basket, surrounding the aforesaid members, rotatably secured to aforesaid rod, and a handle slidably connected with aforesaid rod.

2. In a meat chopper the combination comprising a central rod, pins arranged in the same plane perpendicularly to and equidistantly on both sides of aforesaid rod, a plurality of safety razor blades arranged parallel to and in a short distance from each other in sets disposed one after the other on both sides of aforesaid rod, means holding said blades on aforesaid pins, an upper basket detachably arranged on aforesaid holding means, a lower basket, surrounding the aforesaid members, rotatably secured to aforesaid rod, and a handle resiliently and slidably connected with aforesaid rod.

3. In a meat chopper the combination comprising a central rod, pins arranged in the same plane perpendicularly to and equidistantly on both sides of aforesaid rod, a plurality of safety razor blades arranged parallel to and in a short distance from each other in sets disposed one after the other on both sides of aforesaid rod, means holding said blades on aforesaid pins, an upper basket detachably arranged on aforesaid holding means, a lower basket, surrounding the aforesaid members, rotatably secured to aforesaid rod, a handle, having a longitudinally extending bore, being slipped over the rear end of aforesaid rod and rigidly secured to the lower basket, and resilient locking means cooperating with said rod and handle to hold the handle on said rod.

ROBERT ROESSLER.